(12) United States Patent
Nakamura

(10) Patent No.: US 7,820,976 B2
(45) Date of Patent: Oct. 26, 2010

(54) RADIATION IMAGE DETECTOR

(75) Inventor: Shigeru Nakamura, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 11/907,060

(22) Filed: Oct. 9, 2007

(65) Prior Publication Data

US 2009/0152464 A1 Jun. 18, 2009

Related U.S. Application Data

(63) Continuation-in-part of application No. 11/757,530, filed on Jun. 4, 2007.

(30) Foreign Application Priority Data

Jun. 2, 2006 (JP) ............................. 2006-154983
May 31, 2007 (JP) ............................. 2007-144392

(51) Int. Cl.
*G01T 1/24* (2006.01)

(52) U.S. Cl. ............................................... 250/370.01

(58) Field of Classification Search ............ 250/370.01, 250/370.11

See application file for complete search history.

(56) References Cited

U.S. PATENT DOCUMENTS 6,770,901 B1 8/2004 Ogawa et al.
2005/0167604 A1* 8/2005 Suganuma et al. ..... 250/370.11

FOREIGN PATENT DOCUMENTS

JP 2005-286183 A 10/2005

* cited by examiner

*Primary Examiner*—David P Porta
*Assistant Examiner*—Mark R Gaworecki
(74) *Attorney, Agent, or Firm*—Sughrue Mion, PLLC

(57) ABSTRACT

A radiation image detector with a moisture-proof structure which is formed easily. The radiation image detector includes: a substrate, a rectangular radiation detection unit provided on the substrate, with signal lines drawn out from each of a pair of opposing sides of the radiation detection unit; electrically insulative rib members provided on the substrate and signal lines along only at most three sides of the circumference of the radiation detection unit; and a moisture-proof film applied along the upper faces of the rib members.

5 Claims, 4 Drawing Sheets

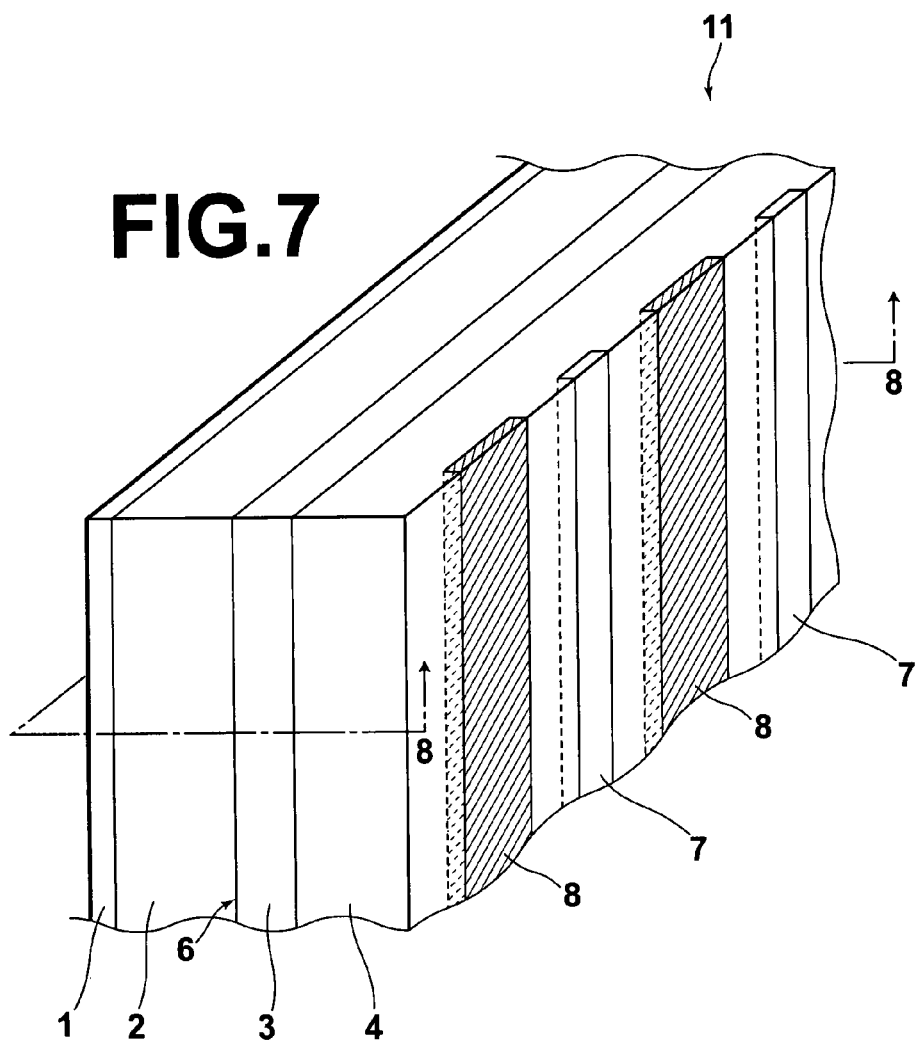
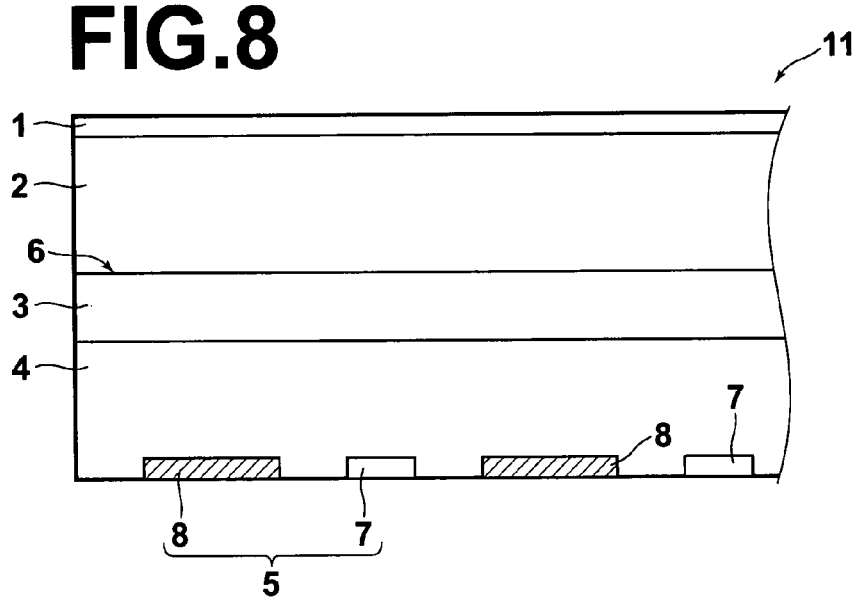

RADIATION IMAGE DETECTOR

This is a Continuation-in-Part of application Ser. No. 11/757,530 filed Jun. 4, 2007, the entire disclosure of which is incorporated herein by reference. This application claims priority from JP 2006-154983 which was filed Jun. 2, 2006, and JP 2007-144392 which was filed on May 31, 2007 in the United States Patent and Trademark Office, the disclosures of which are incorporated herein by reference in their entirety.

BACKGROUND OF THE INVENTION

1. Field of the Invention

The present invention relates to a radiation image detector, in particular, to a moisture prevention structure of the detector.

2. Description of the Related Art

A variety of direct type radiation image detectors is proposed and put into practical use in the medical and other industrial fields. These detectors are constructed to receive radiation transmitted through a subject to generate charges, and to record a radiation image of the subject by storing the charges therein.

U.S. Pat. No. 6,770,901 proposes an X-ray imaging device that uses amorphous selenium as a photoconductive layer, and X-rays are irradiated on the photoconductive layer with a bias voltage being applied thereto, thereby charges generated therein are detected. Such detectors are preferable to be fully covered by a moisture-proof structure, since sensitivity of the detectors is gradually degraded due to environmental moisture, in addition to increased image defects.

One such moisture-proof structure is proposed as described, for example, in Japanese Unexamined Patent Publication No. 2005-286183, in which a frame-like spacer is provided on the detector, and hardening synthetic resin is filled between the frame and an accessory plate disposed thereon, thereby a moisture-proof structure is formed.

Forming the frame-like spacer, however, is difficult depending on the material used, and simpler moisture-proof structures have been demanded.

Further in a radiation image detector used for mammography, for example, it is preferable that the amorphous selenium layer or the like be extended (provided), as close as possible, to the edges of the detector, so that mammography is performed to a portion as close to the chest wall as possible. But, it has been difficult to satisfy both the requirement related to the arrangement of the amorphous selenium layer or the like and moisture proof capabilities.

SUMMARY OF THE INVENTION

In view of the circumstances described above, it is an object of the present invention to provide a radiation image detector with a moisture-proof structure which is formed more easily.

The radiation image detector of the present invention is a radiation image detector including:

a substrate;

a rectangular radiation detection unit provided on the substrate, with signal lines drawn out from each of a pair of opposing sides of the unit;

electrically insulative rib members provided on the substrate and signal lines along only at most three sides of the outer circumference of the radiation detection unit; and a moisture-proof film applied along the upper faces of the rib members.

In the radiation image detector of the present invention, the rib members may be provided on the substrate and signal lines along only two sides of the outer circumference of the radiation detection unit.

Further, in the radiation image detector of the present invention, each of the rib members may have a thickness which is substantially equal to a thickness of the radiation detection unit.

According to the radiation image detector of the present invention, electrically insulative rib members are provided on the substrate and signal lines along only at most three sides of the outer circumference of the radiation detection unit, and a moisture-proof film is applied along the upper faces of the rib members. This does not require a frame-like spacer to be formed, as required in the past, so that a moisture-proof structure is formed more easily.

As for the rib member, glass may be used other than synthetic resin. Preferably, glass is used in order to ensure a high moisture-proof property. In this case, the structure of the present invention is particularly effective.

Further, the application of a moisture-proof film along the upper faces of the rib members may seal the radiation detection unit more tightly, in comparison with the case in which four sides of the moisture-proof film are bonded directly to the substrate.

Further, the rib members may protect the signal lines from breakage.

Still further, the moisture-proof structure formed of the rib members along at most three sides of the detector and a moisture proof film according to the present invention is applicable to a radiation image detector with the image detection unit extending to the edges of the substrate, and may effectively protect the detector from moisture.

BRIEF DESCRIPTION OF THE DRAWINGS

FIG. 7 is a perspective view of a radiation detection unit, illustrating schematic construction thereof.

FIG. 8 is a cross-sectional view of the radiation detection unit taken along the line 8-8 in FIG. 5.

DESCRIPTION OF THE PREFERRED EMBODIMENTS

Figure 1:
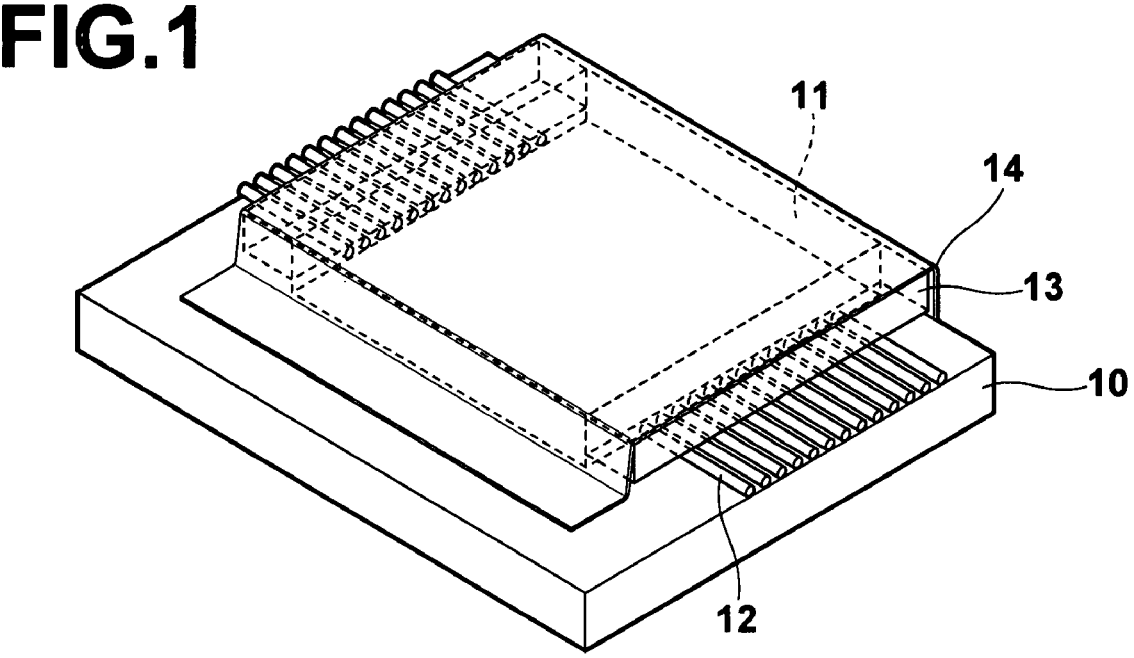
FIG. 1 is a perspective view of an embodiment of the radiation image detector of the present invention.
Figure 2:
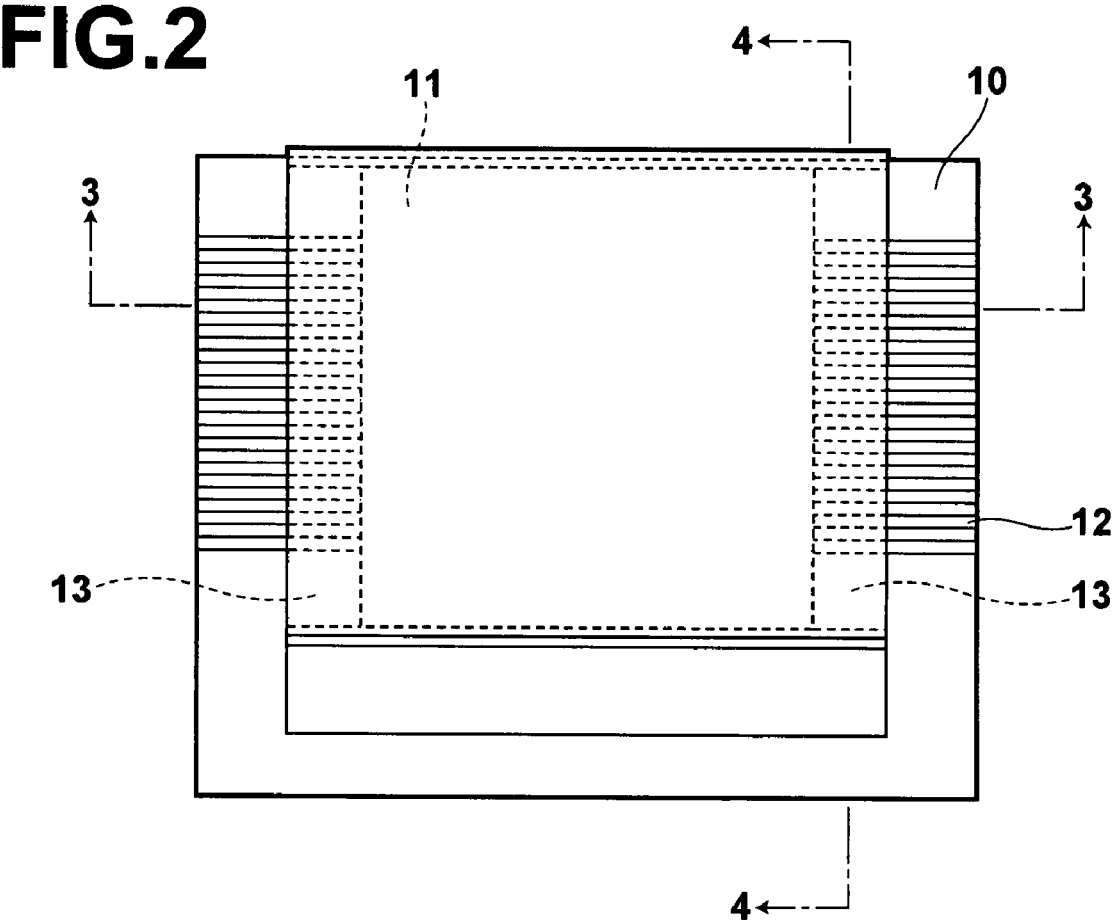
FIG. 2 is a top view of the radiation image detector shown in FIG. 1.
Figure 3:
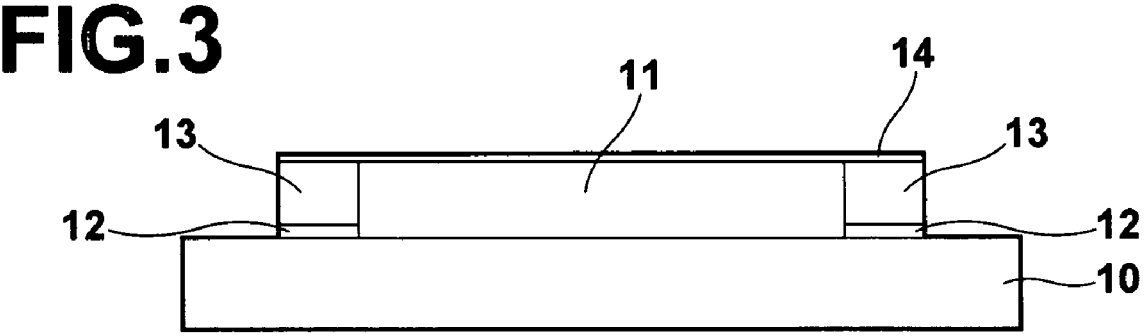
FIG. 3 is a cross-sectional view of the radiation image detector taken along the line 3-3 in FIG. 2.
Figure 4:
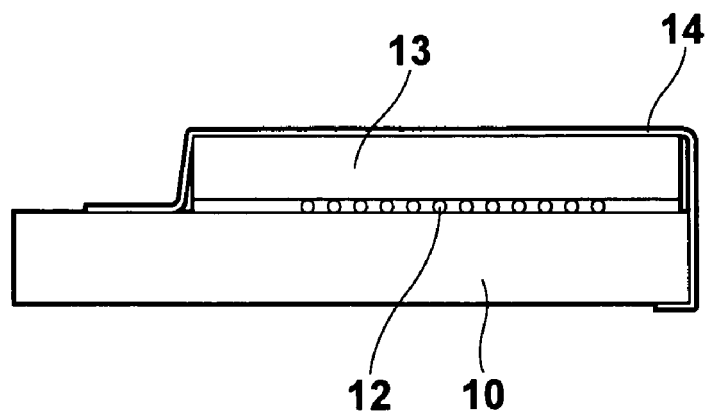
FIG. 4 is a cross-sectional view of the radiation image detector taken along the line 4-4 in FIG. 2.

Hereinafter, an exemplary embodiment of the radiation image detector of the present invention will be described with reference to the accompanying drawings. FIG. 1 is a perspective view of the radiation image detector. FIG. 2 is a top view of the radiation image detector shown in FIG. 1. FIG. 3 is a cross-sectional view of the radiation image detector taken along the line 3-3 in FIG. 2. FIG. 4 is a cross-sectional view of the radiation image detector taken along the line 4-4 in FIG. 2.

The radiation image detector according to the present embodiment includes: a glass substrate 10; a rectangular radiation detection unit 11 provided on the glass substrate; signal lines 12 drawn out from a pair of opposing sides of the radiation detection unit 11; a rib member 13 provided only along each of the pair of opposing sides of the radiation detection unit 11; and a moisture-proof film 14 applied over the rib members 13 and upper face of the radiation detection unit 11, as illustrated in FIGS. 1 to 4.

As for the glass substrate 10, a glass substrate having an arbitrary thickness may be used, but typically with a thickness of 0.5 mm to 2.5 mm, preferably 1 mm to 2 mm, is used.

The signal lines 12 are drawn out from a pair of opposing sides of the bottom face of the radiation detection unit 11, and arranged on the glass substrate 10.

Each of the rib members 13 is formed of a material having insulation properties in a rectangular solid shape, and has a length which is equal to that of the pair of opposing sides of the radiation detection unit 11. Preferably, each of the rib members 13 has a thickness which may prevent a hole from developing in the moisture-proof film 14 due to wrinkling when applied over the rib members 13 and the upper face of the radiation detection unit 11, that is, approximately +30% of the thickness of the radiation detection unit 11, and more preferably, approximately equal to the thickness of the radiation detection unit 11. As for the material of the rib members 13, glass or plastic may be used, but glass is preferable. The rib members 13 are bonded by an adhesive on the glass substrate with the signal lines 12 provided thereon.

Preferably, the adhesive is an epoxy adhesive, and type II reactive epoxy adhesive, thermoset epoxy adhesive, or light-curable epoxy adhesive may be used.

The moisture-proof film 14 may be selected from those with a moisture permeability less than or equal to 0.2 g·25 µm/m²·24 hr measured under the conditions of 40° c., 90% RH. Examples of such moisture-proof films include a polyethylene terephthalate film with silicon oxide or aluminum oxide vapor deposited thereon, and an aluminum foil with a polymer film laminated on each side, and the like. The polymer film laminated on the aluminum foil may be made of a material, such as polyethylene terephthalate, nylon, polyethylene, or polypropylene.

The moisture-proof film 14 is applied along the surface of the rib members 13, as illustrated in FIGS. 1 to 4. At one side of the radiation detection unit 11 where the signal lines 12 are not drawn out, one end of the moisture-proof film 14 is folded down along the side face and bonded to the surface of the glass substrate 10. The other end of the moisture-proof film 14 is folded down along the side face on the other side of the radiation detection unit 11 where the signal lines 12 are not drawn out, and further folded down along the side and bottom faces of the glass substrate 10 and bonded to the bottom face.

Preferably, an epoxy adhesive is used for the application of the moisture-proof film.

An extra portion of the moisture-proof film may be removed by moving a cutter blade on the film bonded on the rib members to make a cut, and peeling off the extra portion.

In the radiation image detector of the present invention, the rib members are disposed on the signal lines. This may protect the signal lines from damage in the subsequent process for providing a sealing structure, which is another advantageous effect of the structure of the present invention.

Figure 5:
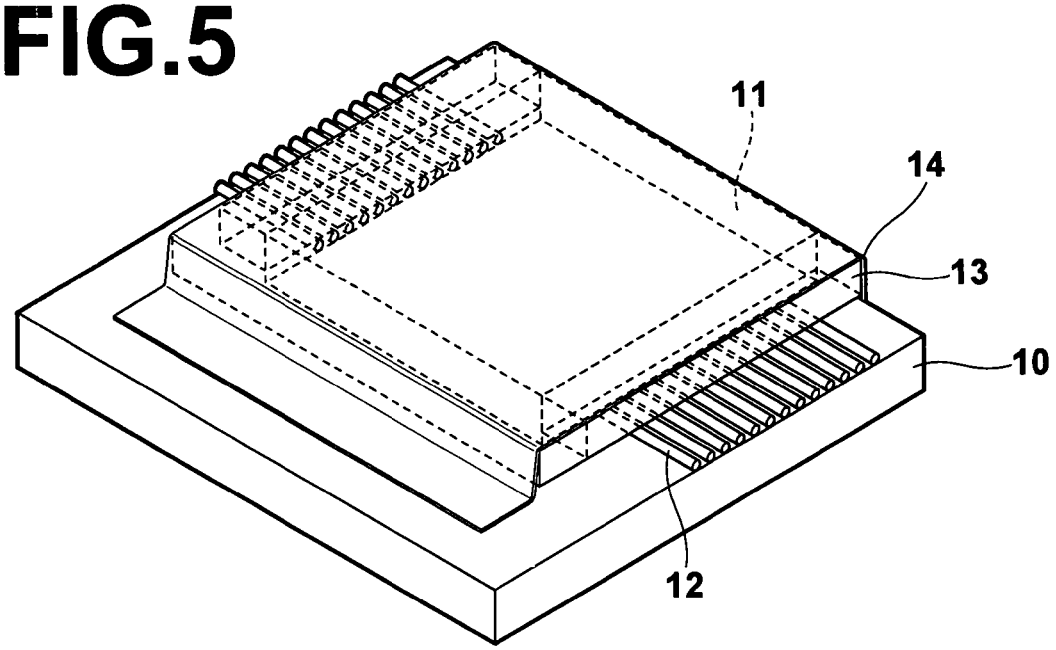
FIG. 5 is a perspective view of another embodiment of the radiation image detector of the present invention.
Figure 6:
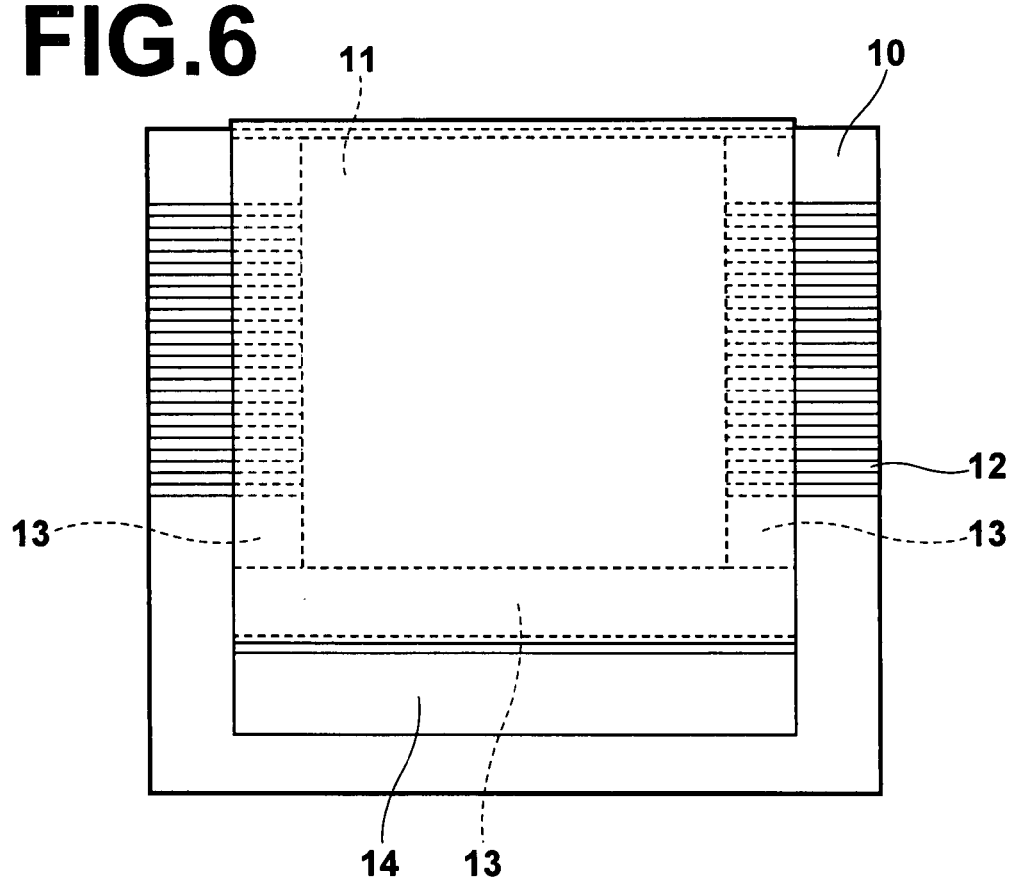
FIG. 6 is a top view of the radiation image detector shown in FIG. 5.

In the radiation image detector according to the embodiment described above, the rib members 13 are disposed along only two sides of the radiation detection unit 11, but the rib members may be disposed along only three sides of the radiation detection unit 11. FIG. 5 is a perspective view of a radiation image detector in which rib members 13 are disposed along only three sides of the radiation detection unit 11, and FIG. 6 is a top view thereof.

In the radiation image detector shown in FIG. 5, the rib members 13 are disposed along only three sides of the four sides of the radiation detection unit 11. For the remaining one side, the radiation detection unit 11 is provided to the edge of the glass substrate 10. Therefore, the radiation image detector shown in FIG. 5, i.e., a radiation image detector with the radiation detection unit extending to the edge portion of the substrate, may be effectively protected from moisture without using a frame-like spacer which is difficult to form.

Here, the rib members 13 form a U-shape, so that they may be integrally formed as a unit by cutting out from a single material. Alternatively, they may be formed by cutting out each rib member 13 in an appropriate shape, then bonding together using one of the adhesives described above. The former may be formed easily in comparison with the frame-like spacer, but latter may be formed easier and preferable.

An example of the radiation detection unit 11 will now be described. FIG. 7 is a partical perspective view of the radiation detection unit 11, and FIG. 8 is a cross-sectional view thereof taken along the line 8-8 in FIG. 7.

As illustrated in FIG. 7, the radiation detection unit 11 includes the following in the order listed below: a first electrode layer 1 that transmits radiation representing a radiation image; a recording photoconductive layer 2 that generates charges when exposed to the radiation transmitted through the first electrode layer 1; a charge transport layer 3 that acts as an insulator against charges having either one of the polarities and as a conductor for charges having the other polarity generated in the recording photoconductive layer 2; a readout photoconductive layer 4 that generates charges when exposed to readout light; and a second electrode layer 5. A storage section 6 for storing the charges generated in the recording photoconductive layer 2 is formed adjacent to the interface between the recording photoconductive layer 2 and charge transport layer 3. Note that the radiation detection unit 11 is formed on the glass substrate 10 with the first electrode layer 1 on the upper side and the second electrode layer 5 on the bottom side.

The first electrode layer 1 may be made of any material as long as it transmits radiation. For example, a NESA film ($SnO_2$), ITO (Indium Tin Oxide), IDIXO (Indemitsu Indium X-metal Oxide, Idemitsu Kosan Co., Ltd.), which is an amorphous state transparent oxide film, or the like with a thickness in the range from around 50 to around 200 nm may be used. Alternatively, Al, or Au with a thickness of 100 nm may also be used.

The second electrode layer 5 includes a plurality of transparent line electrodes 7 that transmits readout light and a plurality of opaque line electrodes 8 that blocks the readout light, which are disposed alternately in parallel at a predetermined distance as shown in FIG. 1.

The transparent line electrode 7 is made of a material which is conductive and transparent to the readout light. It may be made of any material as long as it has the properties described above. Such materials include, for example, ITO and IDIXO as in the first electrode layer 1. Alternatively, the electrode 7 may be formed with a metal such as Al, Cr, or the like with a thickness that allows the readout light to transmit therethrough (e.g., around 10 nm).

The opaque line electrode 8 is made of a material which is conductive and opaque to the readout light. It may be made of any material as long as it has the properties described above, and a metal such as Al, Cr, or the like may be used.

The signal lines 12 are the transparent line electrodes 7 and opaque line electrodes 8 extended and drawn out of the radiation detection unit 11.

The recording photoconductive layer 2 may be made of any material as long as it generates charges when exposed to radiation. Here, a material that includes a-Se as the major component is used, since a-Se has superior properties, such as relatively high quantum efficiency for radiation, and high dark resistance. Preferably, the thickness of the recording photoconductive layer 2 is around 500 μm.

As for the material of the charge transport layer 3, for example, a material having a greater difference in charge mobility between the charges charged on the first electrode layer 1 and the charges having the opposite polarity when a radiation image is recorded (for example, not less than $10^2$, more preferably, not less than $10^3$), is preferably used. In this respect, organic compounds such as polyN-vinylcarbazole (PVK), N,N'-diphenyl-N,N'-bis(3-methylphenyl)-[1,1'-biphenyl]-4,4'-dia mine (TPD), discotic liquid crystal, and the like, or semiconductor materials, such as TPD-dispersed polymers (polycarbonate, polystyrene, PVK), a-Se or $As_2Se_3$ doped with 10 to 200 ppm of Cl, and the like are preferably used.

The readout photoconductive layer 4 may be made of any material as long as it shows conductivity when exposed to the readout light or erasing light. For example, a photoconductive material that consists mainly of at least one of the materials selected from the group of a-Se, Se—Te, Se—As—Te, non-metal phthalocyanine, metal phthalocyanine, MgPc (Magnesium phthalocyanie), VoPc (phase II of Vanadyl phthalocyanine), CuPc (Copper phthalocyanine), and the like is preferably used. Preferably, the thickness of the readout photoconductive layer 4 is around 0.1 μm to around 1.0 μm.

An example method for producing the radiation image detector according to the present embodiment may include the steps of: forming the radiation detection unit 11 on the glass substrate 10 by vapor deposition; then bonding the rib members; and applying the moisture-proof film 14 over the rib members 13 and upper face of the radiation detection unit 11. But the rib members 13 may be bonded prior to forming the radiation detection unit 11. More specifically, the method may include the steps of: bonding rib members on a glass substrate with the signal lines 12 formed thereon using a thermoset epoxy adhesive; then forming the radiation detection unit 11 by vacuum film forming; and finally applying a moisture-proof film along the rib members using an adhesive.

As for the radiation detection unit 11, the configuration is not limited to that described above, and it may be a so-called indirect type radiation detection unit in which radiation is converted to visible light by a phosphor layer, and then the visible light is photoelectrically converted.

What is claimed is:

1. A radiation image detector, comprising:
   a substrate;
   a rectangular radiation detection unit provided on the substrate, with signal lines drawn out from each of a pair of opposing sides of the unit;
   electrically insulative rib members provided on the substrate and signal lines along only at most three peripheral edges of the radiation detection unit; and
   a moisture-proof film applied along the upper faces of the rib members;
   the rib members being formed as discrete rectangular columns, and the plurality of rib members provided along each of the at most three peripheral edges of the radiation detection unit.

2. The radiation image detector according to claim 1, wherein the rib members are provided on the substrate and signal lines along only two sides of the outer circumference of the radiation detection unit.

3. The radiation image detector according to claim 2, wherein each of the rib members has a thickness which is substantially equal to a thickness of the radiation detection unit.

4. The radiation image detector according to claim 1, wherein each of the rib members has a thickness which is substantially equal to a thickness of the radiation detection unit.

5. A radiation image detector according to claim 1, wherein the rib members and the radiation detection unit are provided without any gaps therebetween.

* * * * *